United States Patent [19]

Warren et al.

[11] 4,063,384
[45] Dec. 20, 1977

[54] METHOD OF AND APPARATUS FOR WASHING SOD STRIPS, AND METHOD OF SODDING WITH WASHED SOD STRIPS

[75] Inventors: Benedict O. Warren, Palos Park; Maurice Rosener, Lockport, both of Ill.

[73] Assignee: Warren Turf Nursery, Inc., Palos Park, Ill.

[21] Appl. No.: 670,540

[22] Filed: Mar. 25, 1976

[51] Int. Cl.² .......................... A01B 45/04; A01G 1/00
[52] U.S. Cl. ........................................... 47/58; 47/56; 172/20; 61/11
[58] Field of Search .................. 40/111, 1–3; 172/19–20, 1; 61/11; 47/56, 58, 1.2

[56] References Cited

U.S. PATENT DOCUMENTS

| | | | |
|---|---|---|---|
| 2,605,589 | 8/1952 | Kuestner | 47/56 |
| 2,876,588 | 3/1959 | Tietz et al. | 47/56 X |
| 3,425,158 | 2/1969 | Kyle | 47/1.2 |
| 3,519,082 | 7/1970 | Miner | 172/20 X |
| 3,664,061 | 5/1972 | Oepen | 47/1.2 |
| 3,863,388 | 2/1975 | Loads | 47/56 |
| 3,890,739 | 6/1975 | Blackburn | 47/56 |
| 3,903,816 | 9/1975 | Brem | 47/56 X |

OTHER PUBLICATIONS

Lawns & Ground Covers, Sunset, Menlo Park, Ca., 1964, p. 10.

*Primary Examiner*—Robert E. Bagwill
*Attorney, Agent, or Firm*—Wegner, Stellman, McCord, Wiles & Wood

[57] ABSTRACT

A sod piece for sodding a soil area is formed to have the root portion thereof substantially free of soil for facilitated transportation and improved transplanting. The soil-free sod piece may be provided in a compact configuration, such as a roll or folded configuration. The soil may be removed from the sod roots by a washing operation. The washed sod may be subsequently dried. The sod piece may be cooled to maintain viability of the sod such as during storage and transportation to the area to be sodded therewith.

9 Claims, 9 Drawing Figures

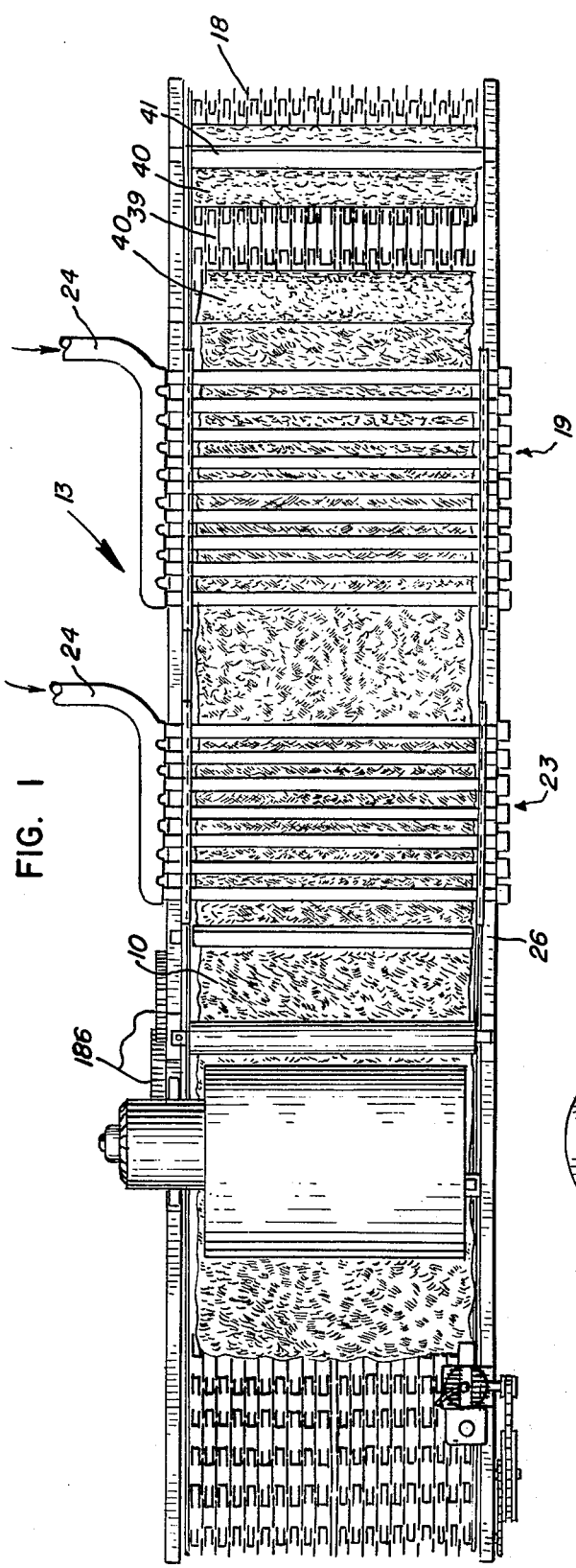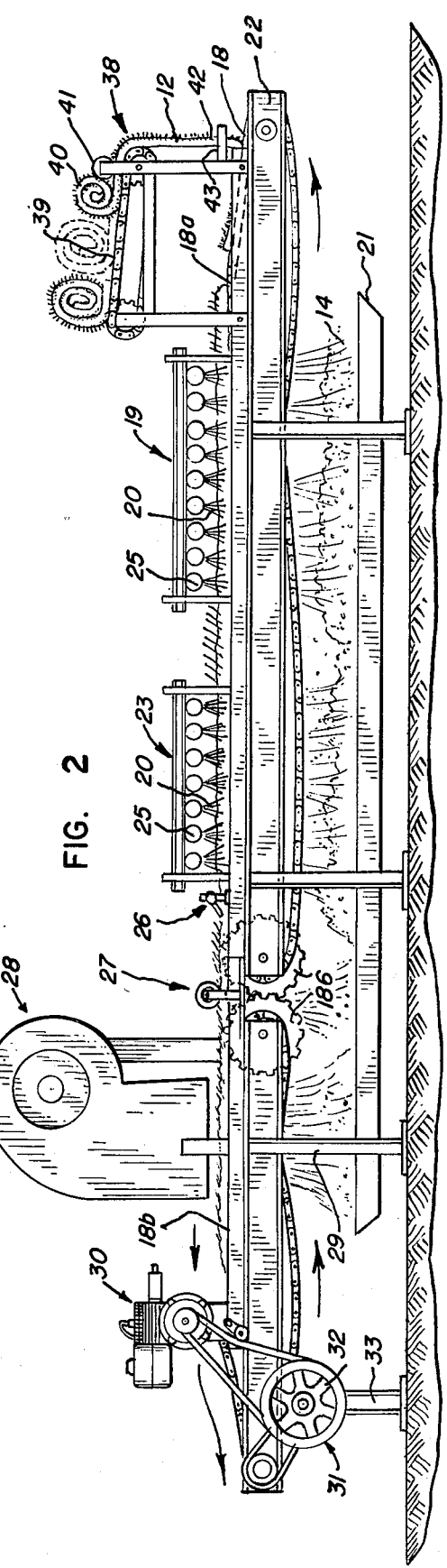

METHOD OF AND APPARATUS FOR WASHING SOD STRIPS, AND METHOD OF SODDING WITH WASHED SOD STRIPS

BACKGROUND OF THE INVENTION

1. Field of the Invention

This invention relates to sod and in particular to treating sod pieces for improved sodding of a soil area therewith.

2. Description of the Prior Art

In the conventional growing of sod, such as for use in sodding a soil area, sod turf is grown at a source site. At an optimum time in the growth of the turf, the turf is removed in the form of sod strips by slicing through the soil below the major portion of the turf plant roots.

Conventionally, the removed sod strips are formed into rolls and transported to the site intended to be sodded therewith. The sod strips are then unrolled in overlying relationship to the soil at the sodding site. Upon completion of the laying of the desired sod strips, they may be suitably compacted downwardly against the underlying soil by conventional roller means. The sod is then suitably maintained so as to cause the roots of the sod to grow downwardly into the subjacent site soil to complete the transplating operation.

In the conventional method of sodding, as discussed above, it is important to provide a proper depth to the soil layer in which the roots are embedded. It has been found that where the soil layer is made overly thick, delay in completing the transplant occurs due to increased time necessary for the roots to grow downwardly into the subjacent site soil. Where the thickness of the soil-root portion is too small, insufficient root structure may be provided to support the turf plants during the critical transplant.

In certain applications, the recipient site soil may be specially prepared, as with fertilizer and other chemicals, so that introduction of soil particles from conventional sod presents a problem. Illustratively, such specially prepared site may be at the tee of greens of a conventional golf course.

Another problem relative to the use of conventional sod is in the application thereof in athletic fields and the like. It is highly desirable to maximize the playability of such fields, and to this end, vacuum-type drainage systems have been installed underlying the fields so as to quickly draw off rain water. It has been found that the soil layer of the conventional sod inhibits the draining of the surplus water downwardly therethrough and, thus, such installations have heretofore not proven completely satisfactory.

SUMMARY OF THE INVENTION

The present invention provides an improved sod piece which, by eliminating the transfer of soil with the roots of the sod, provides a substantially improved facility in storage, transportation, and success of transplanting.

It has been found that by removing the soil from the roots in the sod pieces subsequent to their removal from the original growing site, and laying the sod pieces on the recipient soil site free of soil therein, improved effective transplanting results.

Further, by eliminating the relatively heavy soil from the sod pieces, a lightweight sod manufacture is produced facilitating storage and transportation as well as subsequent transplanting operations.

In the illustrated embodiment of the invention, the sod strips removed from the growing site are washed as by directing jets of water against the root soil so as to remove the soil therefrom. By collecting the removed soil and water in suitable basins, the soil may be returned to the growing site for further use, and the washing water may similarly be reused, thereby providing high efficiency in the growing of sod.

The sod strips may be washed by directing the washing water downwardly with the sod strips inverted so as to expose the root portion uppermost.

Subsequent to the washing operation, the excess water may be removed from the washed sod by squeegeeing and/or blowing drying air thereagainst.

Decreased biological activity results from the cooling of the sod pieces by the washing water and thus facilitates storage and transportation. If desired, the washed sod may be vacuum-cooled to a low temperature, such as slightly above freezing.

The sod pieces may be stored and transported in compact form, such as in rolled or folded form, as desired.

The invention provides an improved sod piece permitting shipment thereof relatively long distances economically. Illustratively, sod of the present invention has been maintained viable for periods of up to four days, permitting shipment thereof as from California to Colorado, while yet assuring high success in the transplanting of the sod.

In addition to providing improved transplanting, the washed sod permits the installation of turf on specially prepared sites, such as tees and greens of a golf course, without the introduction of foreign soil particles from the original sod growing site.

The use of the washed sod of the present invention is further advantageous in connection with athletic field installations. Such athletic fields are conventionally arranged to provide enhanced growing of the turf as by underground electric heating cables and underground drainage facilities. The washed sod of the present invention may be placed directly on the upper sand base with the dirt-free root and rhizome system permitting facilitated drainage as by the conventional vacuum draining means conventionally employed in such fields.

The sod of the present invention is highly economical while yet providing the highly desirable features discussed above.

BRIEF DESCRIPTION OF THE DRAWING

Other features and advantages of the invention will be apparent from the following description taken in connection with the accompanying drawing wherein:

FIG. 1 is a top plan view of an apparatus for removing soil from the sod;

FIG. 2 is a side elevation thereof;

Figure 4:
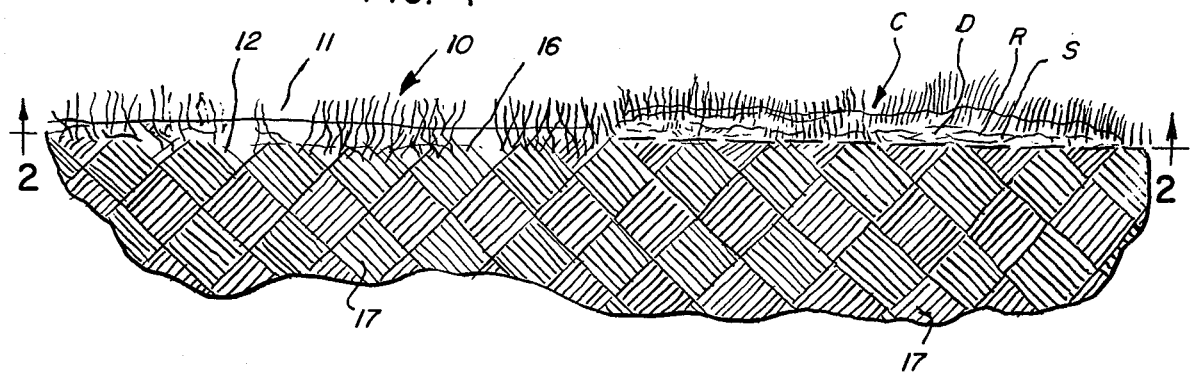
FIG. 4 is a fragmentary vertical section of a recipient site illustrating a transplant of sod embodying the invention at the left thereof, and a transplant of prior art sod at the right thereof.

In the exemplary embodiment of the invention as disclosed in the drawing, a sod piece generally designated 10 is shown to comprise a piece of turf having a plurality of live plants 11, such as grass plants, and intertwined roots 12. The invention comprehends providing the sod with the intertwined roots substantially free of soil for facilitated storage, transportation, and transplanting.

In the illustrated embodiment, the sod piece comprises a strip of sod removed from the growing site by conventional sod stripping apparatus (not shown). The sod strip so removed is delivered to a washing apparatus generally designated 13 wherein the soil 14 is removed from the intertwined roots 12.

After removal of the soil 14 from the sod piece, the soil-free sod piece is then further treated as by squeegeeing, wringing, and blower drying, prior to arrangement in a suitable form for transportation as desired. The washing action tends to cool the sod piece thereby decreasing biological activity of the sod with the roots 12 thereof exposed to the air. If desired, the sod piece may be vacuum-cooled to a slightly-above freezing temperature during storage and transportation as where a substantial period of time may be involved in the storage and transportation process.

At the site to be sodded, the sod piece is laid on the upper surface 16 of the recipient site soil 17 with the soil-free root portion 12 lowermost. The thusly placed sod may then be rolled to assure good contact between the roots and the subjacent soil surface 16, and maintenance of the transplanted sod subsequently effected in the normal manner.

Referring now to FIG. 4, it has been found that the use of the sod piece 10 with soil-free root portion 12 provides an expedited, high efficiency transplant with the roots growing down into the subjacent soil 17 rapidly to effect a successful transplant. This condition is illustrated in the lefthand side of FIG. 4.

As shown on the righthand side of FIG. 4, a conventional piece of sod generally designated C is shown as positioned on the upper surface S of the recipient site with the roots R in the soil D of the sod piece having less extension down into the subjacent recipient soil 17. It has been found that not only do the roots of the sod piece 10 enter the recipient soil more rapidly than in the conventional sod pieces wherein the roots are maintained in a body of soil from the original growing site, but further, a more positive bonding of the sod to the new soil site is effected.

Figure 3:
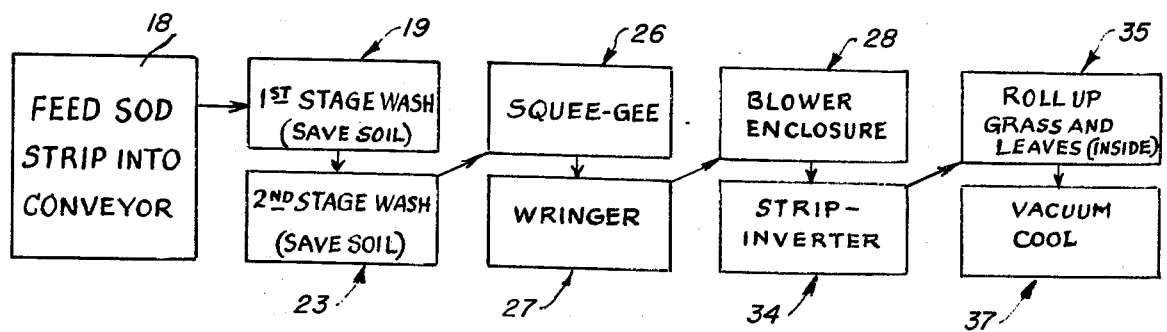
FIG. 3 is a schematic block diagram of the improved sod washing method embodying the invention.

More specifically, the improved growing of sod 10 is schematically illustrated in FIG. 3. As shown therein, the sod strip is firstly delivered onto a conveyor 18 of washing apparatus 13 which delivers it to a first washing apparatus 19. In the illustrated embodiment, the sod strip is laid on conveyor 18 with the roots 12 uppermost. To effect such deposit of the sod strip on conveyor 18, a sod turner generally designated 38 is mounted to the righthand end of frame 22 of apparatus 13 and includes an inverter conveyor 39 on which the rolled sod 40 is placed. The conveyor urges the rolled sod 40 against a stop bar 41 while allowing the distal end 42 of the rolled sod to move with the conveyor 39 under the stop bar and downwardly onto the main conveyor 18 with the roots 12 of the sod disposed upwardly. A deflector bar 43 may be provided for guiding the distal end 42 of the sod onto conveyor 18, as needed.

Conveyor 39 is suitably driven to advance the sod strip at substantially the same speed as conveyor 18.

As shown in FIG. 2, the washing apparatus 19 provides a plurality of forceful water jets 20 directed downwardly against the root portion 12 to wash the soil from the roots. The washed soil passes with the water downwardly through the conveyor 18 and into a subjacent collector 21. The collector may define a suitable settling pan wherein the removed soil 14 is collected for return to the growing site and the washing water is sufficiently freed of the soil so as to permit its reuse in subsequent sod washing operations.

As shown in FIG. 2, the conveyor 18 may be carried on the frame 22. The conveyor may comprise a first portion 18a for carrying the sod pieces past the washing means, and a second portion 18b for delivering the washed pieces. The two carrying portions may be interconnected by suitable interconnecting drive means 18c.

Frame 22 also supports washer 19 to overlying relationship to the collector 21. As further shown in FIG. 2, a second washer 23 may be provided to effect a second washing operation to assure substantially full removal of the soil from roots 12.

Collector 21 may comprise a relatively broad concrete gutter which permits draining the wash water and soil through a series of descending dams to a suitable reservoir pond (not shown). As shown in FIG. 1, the spray water may be delivered to the washers 19 and 23 through suitable delivery conduits 24.

In the illustrated embodiment, washer 19 includes 18 nozzles 25 aimed directly downwardly to impinge the jet streams 20 vertically on the root portion 12 of the sod piece. As will be obvious to those skilled in the art, the jets may be suitably angled as desired and the jets may be directed at the sod not only from directly above, but from the side and from below the sod as desired. Similarly, while the invention is shown with the sod arranged to have the root portion 12 uppermost, suitable washing may be effected with the sod arranged with the root portion lowermost and the washing jets suitably directed thereagainst as from below the conveyor 18. In the illustrated embodiment, the jets 20 are provided at a pressure of approximately 70 p.s.i., which has been found to provide excellent soil removal functioning.

After leaving the second washer 23, the soil-removed sod strips are delivered under flexible squeegee means 26 which may be inclined in the direction of the strip movement, i.e., toward the left as seen in FIGS. 1 and 2, to remove a portion of the water retained in the relatively dense mat structure of the intertwined root system 12.

From the squeegee 26, the partially dried mat is delivered to a roller means 27 which is suitably driven in the direction of the strip movement to have a circumferential speed substantially equal to the linear speed of the strip to further compress the strip against the conveyor to wring out additional water from the sod piece. The roller means may comprise a pair of spring-biased wringer rollers arranged as shown to pass the washed sod therebetween. As shown in FIGS. 1 and 2, the squeegee 26 and roller means 27 may be mounted on the frame 22.

After leaving the rollers 27, the further dried sod piece is delivered to a blower means generally designated 28 arranged to direct a stream of drying air against the sod piece so as to effectively complete the drying thereof. As shown in FIG. 2, the blower may be mounted to a suitable standard 29 to overlie the conveyor at the lefthand end of frame 22.

The conveyor may be suitably driven by an engine generally designated 30 and a belt drive 31. The engine may be mounted to frame 22, as shown in FIG. 2, with the belt drive pulley 32 carried on a suitable standard 33.

Figure 5:
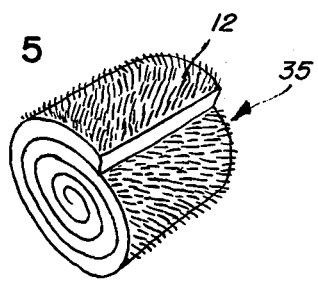
FIG. 5 is a perspective view of a roll of the sod as arranged for transportation.
Figure 6:
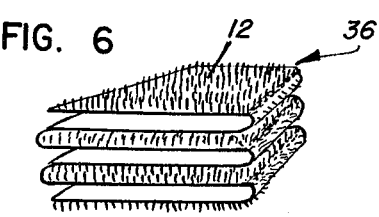
FIG. 6 is a perspective view of a folded piece of the sod as arranged for transportation.

The dried soil-removed sod piece is now ready for storage and/or transportation to the recipient site to be sodded. To facilitate such storage and/or transportation, the sod may be firstly inverted by a suitable strip inverter 34 of any conventional configuration. The sod strip may be arranged in a compact configuration as by rolling the strip into a suitable roll generally designated 35, as shown in FIG. 5. As shown therein, the strip may be arranged with the root portion 12 outermost. Alternatively, the sod piece may be placed in a folded compact arrangement generally designated 36, as shown in FIG. 6. Here again, the strip may be arranged with the root portion 12 outermost. With the root portion 12 of the sod strip exposed to the air, it is desirable to inhibit biological activity of the sod plants during storage and/or transportation thereof to the recipient site.

The washing water effectively cools the sod so as to provide inhibition of such biological activity. Such wash water may conventionally have a temperature of approximately 50° F. and tends to effect such inhibition for up to 24 hours or more.

Where the sod strips are loaded on a truck trailer, the trailer may be moved into a suitable building for vacuum cooling as by a conventional vacuum-cooling apparatus generally designated 37. Thus, the sod strips may be maintained at a temperature slightly above freezing, such as in the range of approximately 35° F. to 40° F. It has been found that at such refrigerated temperatures the sod may be maintained highly viable for periods of up to three or four days or more, permitting the sod strips to be shipped relatively long distances and thereby permitting the recipient site to be remote from the sod growing site.

It has been found that the removal of the soil from the root portion 12 causes the resulting soil-free sod strips to weigh only approximately one-third as much as the conventional sod strips wherein the soil is retained in association with the root portion. Thus, the sod strips may be more readily handled and greater quantities thereof may be transported in a given volume truck reducing the cost of the handling of the sod strips and permitting economical use thereof at remote sites.

As indicated briefly above, in addition to the improved facility in the handling and the improved economy therein, the improved sod of the present invention also provides a substantially improved transplanting operation wherein the sod substantially more quickly takes hold in the recipient site soil. It has been found that where the soil is relatively loose sandy soil, penetration of the roots is as much as twice as fast in the first ten days of the transplant as compared to conventional sod. The first ten days of transplant comprise the most crucial days and, thus, the improved expedited growth of the sod root system into the recipient soil provides substantially improved results in the transplanting operation.

Thus, the present invention comprehends an improved methods of sodding wherein the sod comprises a turf piece wherein the soil is removed from the root system thereof. In the illustrated embodiment, the soil removal is effected by a washing operation which is made highly efficient by the reuse of the soil and the washing water. The invention not only provides substantially improved economies and facility in the provision of such sod, but further provides substantially improved transplanting success and speed.

The soil-free sod of the present invention permits the installation of the sod on sites which may be specially prepared, as with fertilizer and other chemicals, without introducing soil particles and the like from the growing site into the recipient site soil. Illustratively, in preparing golf tees or greens, special treatment of the site soil is effected and it is highly desirable to prevent introduction of new soil particles onto the prepared site soil. The present invention permits such a transplanting operation inasmuch as the washed sod is substantially free of site soil.

Figure 7:
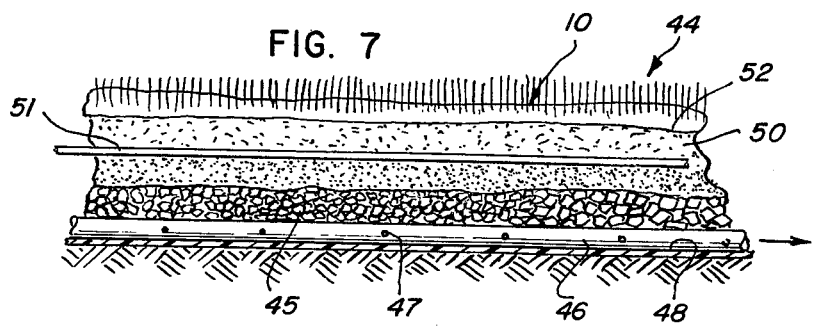
FIG. 7 is a fragmentary vertical section of a sod installation for use as on athletic fields.

The washed sod of the present invention provides an improved turf in athletic fields and the like permitting facilitated drainage and resultant playability. Thus, as shown in FIG. 7 illustrating a section of an athletic field generally designated 44, the underlying site may be provided with a bottom layer 45 of coarse material, such as stone, rock, rock chips, and the like, overlying suitable drainage pipes 46 connected to vaccum facilities (not shown). The drainage pipes are provided with suitable small openings 47 for drawing water from the surrounding rock layer as a result of the application of a suitable vacuum to the pipes. As shown in FIG. 7, the pipes may be provided closely adjacent the upper surface 48 of the underlying site soil 49.

Overlying the base layer 45 may be provided a layer of sand 50 in which may be installed suitable heating cables 51 which may be suitably controlled to extend the growing season of the athletic field turf.

In the athletic field installation 44, the turf is defined by washed sod strips of the present invention. As shown in FIG. 7, the washed sod is placed directly on the upper surface 52 of the sand layer 50. The roots of the sod pieces 10 quickly penetrate downwardly into the sand. In the illustrated embodiment, the base rock layer may have a depth of approximately 6 to 8 inches, with the sand layer having a depth of approximately 16 inches. Thus, the roots may extend downwardly through the sand layer up to 16 inches to provide a firm retention of the sod in place in the installation.

In such an athletic field installation, it is desirable to maintain the sand somewhat moist to further improve the firmness of the field by effectively precluding slippage between the sand particles.

The resultant turf provides a substantially improved athletic field turf avoiding the disadvantages of synthetic athletic field turf and providing improved safety to athletes playing thereon.

Conventionally in removing sod from the growing site, approximately one-half inch of soil is cut with the sod strips, which conventionally are cut to be approximately 6 feet long by 1½ feet wide, thereby providing a coverage of approximately 1 square yard. In the conventional sod transplanting operation, this soil is transferred to the recipient site so that the sod growing site is depleted. In certain areas, such soil depletion raises serious ecological problems. With the present invention, the soil which is originally removed with the sod strips may be returned to the growing site for reuse. The present invention recognizes the growing site soil as a natural resource which is preserved for continuing recycling.

At the time of cutting the sod strip from the growing site, a substantial portion of the root system is cut off. In a typical turf, the roots penetrate many inches into the growing site soil. In the transplanting operation, the new roots tend to grow primarily from the rhizomes and the presence of the dirt in the conventional sod, to some extent, hinders the generation of new roots. It has been found that by elimination of the dirt, the rhizomes rapidly generate new roots which rapidly reach down into the recipient site soil for improved facilitated transplanting of the sod.

The foregoing disclosure of specific embodiments is illustrative of the broad inventive concepts comprehended by the invention.

We claim:

1. A method of washing lengths of grass sod having its root structure embedded in a thickness of soil comprising: positioning a length of sod upon a conveyor belt; advancing the conveyor belt and the length of sod past a station provided with a plurality of jets each for emitting a water spray; and spraying the length of sod with water to remove substantially all of the soil from the length of sod to provide a mat of grass leaves held together by its root structure.

2. A method of washing sod as specified in claim 1 in which the positioning step includes placing the length of sod upon a reticulated conveyor belt.

3. A method of washing sod as specified in claim 1 in which the spraying step includes directing the jets and the water sprays against the exposed soil on one of the sides of the sod length.

4. A method of washing sod as specified in claim 1 including the step of capturing the soil washed from the sod length for reuse of the soil.

5. A method of washing sod as specified in claim 1 in which the positioning step includes placing the length of sod upon the conveyor belt so that the side of the length of sod having the soil is upwardly exposed.

6. A method of washing sod as specified in claim 1 including the step of drying the grass leaves and root structure of the mat.

7. A method of washing sod as specified in claim 1 in which the positioning step includes placing the length of sod upon a reticulated conveyor belt so that the side of the length of sod having the soil is upwardly exposed, and in which the advancing step includes passing the length of sod beneath the jets of said station.

8. A method of washing sod as specified in claim 1 and including an additional step of applying pressure to opposite sides of the mat to remove excess water from the grass leaves and root structure of the mat.

9. A method of washing sod as specified in claim 1 including the additional steps of applying pressure to opposite sides of the mat to remove excess water from the grass leaves and root structure of the mat, and then drying the mat to remove the remaining water from the grass leaves and root structure.

* * * * *